US011477083B2

United States Patent
Miller et al.

(10) Patent No.: US 11,477,083 B2
(45) Date of Patent: Oct. 18, 2022

(54) INDUSTRIAL INTERNET CONNECTED CONTROL SYSTEM

(71) Applicant: INTELLIGENT PLATFORMS, LLC, Charlottesville, VA (US)

(72) Inventors: Daniel Halvard Miller, Charlottesville, VA (US); Keith George McNab, Loudonville, NY (US); Wesley Michael Skeffington, Ballston Lake, NY (US); Michael Joseph Yoensky, Charlottesville, VA (US); Steven J. Sullivan, Roanoke, VA (US); William David Smith, II, Schenectady, NY (US); John Ronald Burr, Salem, VA (US)

(73) Assignee: INTELLIGENT PLATFORMS, LLC, Charlottesville, VA (US)

( * ) Notice: Subject to any disclaimer, the term of this patent is extended or adjusted under 35 U.S.C. 154(b) by 720 days.

(21) Appl. No.: 15/843,882

(22) Filed: Dec. 15, 2017

(65) Prior Publication Data

US 2018/0173205 A1   Jun. 21, 2018

Related U.S. Application Data

(60) Provisional application No. 62/435,610, filed on Dec. 16, 2016.

(51) Int. Cl.
   *G05B 19/042*   (2006.01)
   *G05B 19/418*   (2006.01)
   (Continued)

(52) U.S. Cl.
   CPC ........ *H04L 41/0869* (2013.01); *G05B 19/042* (2013.01); *G05B 19/0421* (2013.01);
   (Continued)

(58) Field of Classification Search
   USPC .......................................................... 700/9
   See application file for complete search history.

(56) References Cited

U.S. PATENT DOCUMENTS 5,339,430 A   8/1994   Lundin et al.
6,298,377 B1 * 10/2001   Hartikainen ....... G05B 19/4185
                                                     709/223

(Continued)

FOREIGN PATENT DOCUMENTS

CN   102354174 A   2/2012
CN   202 218 269 U   5/2012

(Continued)

OTHER PUBLICATIONS

"Miller, D.H., et al., Industrial internet connected control system, GE Pending Application No. 621435610, filed on Dec. 16, 2016".

(Continued)

*Primary Examiner* — Jason D Mitchell
(74) *Attorney, Agent, or Firm* — Marshall, Gerstein & Borun LLP

(57) ABSTRACT

An apparatus is provided. The apparatus including a plurality of network interfaces, including a first network interface and a second network interface. The apparatus also includes a processor with two or more independent processing units, including a first independent processing unit and a second independent processing unit. The apparatus further includes a memory having first instructions and second instructions stored thereon. Execution of the first instructions, cause the first independent processing unit to execute operations associated with a first operating system and communicate, via the first network interface, over a bi-direction communication, with one or more platform computing devices. Execution of the second instructions, cause the second independent processing unit to execute real-time operations associated with a second operating system and communi- (Continued)

cate, via the second network interface, with one or more computing devices each having one or more sensors thereon.

19 Claims, 6 Drawing Sheets

(51) Int. Cl.
| | |
|---|---|
| H04L 41/0869 | (2022.01) |
| H04L 67/10 | (2022.01) |
| G06F 8/73 | (2018.01) |
| H04L 43/50 | (2022.01) |
| H04W 4/00 | (2018.01) |
| G06F 8/65 | (2018.01) |
| G06F 21/57 | (2013.01) |
| H04L 67/00 | (2022.01) |
| H04W 4/38 | (2018.01) |
| H04L 41/0253 | (2022.01) |
| H04L 41/00 | (2022.01) |

(52) U.S. Cl.
CPC ..... *G05B 19/0423* (2013.01); *G05B 19/0426* (2013.01); *G05B 19/4185* (2013.01); *G05B 19/4186* (2013.01); *G05B 19/4187* (2013.01); *G05B 19/41835* (2013.01); *G06F 8/65* (2013.01); *G06F 8/73* (2013.01); *G06F 21/577* (2013.01); *H04L 43/50* (2013.01); *H04L 67/10* (2013.01); *H04L 67/34* (2013.01); *H04W 4/00* (2013.01); *H04W 4/38* (2018.02); *G05B 2219/21086* (2013.01); *G05B 2219/24071* (2013.01); *G05B 2219/25064* (2013.01); *H04L 41/0253* (2013.01); *H04L 41/24* (2013.01); *Y02P 90/02* (2015.11); *Y02P 90/80* (2015.11)

(56) References Cited

U.S. PATENT DOCUMENTS

| | | | |
|---|---|---|---|
| 6,668,374 | B1 | 12/2003 | Sten et al. |
| 7,010,294 | B1 | 3/2006 | Pyotsia et al. |
| 7,203,560 | B1 | 4/2007 | Wylie et al. |
| 7,263,546 | B1 | 8/2007 | Kostadinov |
| 7,355,730 | B2 | 4/2008 | Landau et al. |
| 7,493,612 | B2 | 2/2009 | Tzeng |
| 7,669,197 | B1 | 2/2010 | O'Neill et al. |
| 7,673,298 | B2 | 3/2010 | Oyama |
| 7,987,305 | B2 | 7/2011 | Blair et al. |
| 8,155,041 | B2 | 4/2012 | Hong et al. |
| 8,276,009 | B2 | 9/2012 | King |
| 8,451,753 | B2 | 5/2013 | Vanga et al. |
| 8,601,170 | B1 | 12/2013 | Marr et al. |
| 8,681,571 | B2 | 3/2014 | Fox et al. |
| 8,756,041 | B2 | 6/2014 | Maturana et al. |
| 8,887,056 | B2 | 11/2014 | Breternitz et al. |
| 9,063,639 | B2 | 6/2015 | Grewal |
| 9,253,054 | B2 | 2/2016 | Maturana et al. |
| 9,798,534 | B1 | 10/2017 | Yi et al. |
| 2006/0179058 | A1 | 8/2006 | Bram et al. |
| 2007/0282463 | A1* | 12/2007 | Hodson ............ G05B 19/4186 700/20 |
| 2008/0114902 | A1 | 5/2008 | Leong et al. |
| 2008/0127356 | A1 | 5/2008 | Hsu et al. |
| 2009/0076628 | A1 | 3/2009 | Smith et al. |
| 2009/0210069 | A1* | 8/2009 | Schultz ............ G05B 19/05 700/7 |
| 2010/0023140 | A1 | 1/2010 | Kodama et al. |
| 2011/0022192 | A1 | 1/2011 | Plache et al. |
| 2012/0291021 | A1 | 11/2012 | Banerjee et al. |
| 2013/0191106 | A1* | 7/2013 | Kephart ............ G06F 30/20 703/21 |
| 2013/0211547 | A1* | 8/2013 | Buchdunger ...... G05B 19/0426 700/11 |
| 2013/0211559 | A1 | 8/2013 | Lawson et al. |
| 2014/0075015 | A1 | 3/2014 | Chan et al. |
| 2014/0101652 | A1 | 4/2014 | Kamble et al. |
| 2014/0172121 | A1* | 6/2014 | Li ..................... H04L 67/125 700/12 |
| 2014/0189677 | A1 | 7/2014 | Curzi et al. |
| 2014/0324196 | A1* | 10/2014 | Burr .................. G05B 19/0428 700/79 |
| 2014/0335480 | A1 | 11/2014 | Asenjo et al. |
| 2014/0336795 | A1 | 11/2014 | Asenjo et al. |
| 2015/0012763 | A1 | 1/2015 | Cohen et al. |
| 2015/0082309 | A1 | 3/2015 | Lambert et al. |
| 2015/0249482 | A1* | 9/2015 | Czaja ................ H04B 5/0031 455/41.1 |
| 2015/0277404 | A1* | 10/2015 | Maturana ............ G05B 15/02 700/83 |
| 2015/0287318 | A1 | 10/2015 | Nair et al. |
| 2015/0316910 | A1* | 11/2015 | Kalan ............... G05B 19/4185 700/11 |
| 2015/0371160 | A1 | 12/2015 | Weatherhead et al. |
| 2016/0132538 | A1 | 5/2016 | Bliss et al. |
| 2016/0182309 | A1* | 6/2016 | Maturana ............ H04L 41/145 709/224 |
| 2016/0274552 | A1* | 9/2016 | Strohmenger ........ G06Q 10/06 |
| 2017/0082986 | A1* | 3/2017 | Tokuhashi ............ H04Q 9/00 |
| 2017/0371700 | A1* | 12/2017 | Karhunen ............ H04W 4/027 |
| 2018/0006913 | A1* | 1/2018 | Asenjo ................ H04L 41/0631 |
| 2018/0052451 | A1* | 2/2018 | Billi-Duran ....... G05B 19/41855 |
| 2018/0176335 | A1 | 6/2018 | McNab |
| 2018/0246743 | A1* | 8/2018 | Rossier .................. G06F 9/547 |
| 2018/0356111 | A1* | 12/2018 | Salsbury ................ H04W 4/38 |
| 2020/0293697 | A1* | 9/2020 | Sion .................... G06F 9/45558 |

FOREIGN PATENT DOCUMENTS

| | | |
|---|---|---|
| CN | 202218269 U | 5/2012 |
| EP | 2688019 A1 | 1/2014 |
| EP | 2 924 570 A2 | 9/2015 |
| EP | 2924570 A2 | 9/2015 |
| EP | 3 070 548 A2 | 9/2016 |

OTHER PUBLICATIONS

"International Search Report and Written Opinion issued in connection with corresponding PCT Application No. PCT/US2017/60089 dated Feb. 14, 2018".

"International Search Report and Written Opinion issued in connection with corresponding PCT Application No. PCT/US2017/064382 dated Mar. 15, 2018".

Welander, Make your I/O smarter, Control Engineering, www.conlroleng.com/single-article/make-your-iosmarter/37788148d81ce850279c60f46135457b.hlml, last visited Jan. 2013, 3 pp.

Leading Technology in Ethernet Relays, Data Acquisition, and Remote Monitoring, ConlrolByWeb, www.conlrolbyweb.com/, last visited Aug. 4, 2016, 6 pp.

Advantech Launches WISE-4051: RS-485 Wireless I/O Module with Cloud Connectivity and IoT Protocol, Advantech Co. Ltd., www2.advantech.in/eautomation/remote-io/news.aspx?doc_id=88f8f32e-fc95-4484-a02c-80543cf7fd56, last visited Jul. 11, 2016, 2 pp.

Renesas Electronics Announces Development of Virtualization Technology Suitable for Real-Time Processing of V850 CPU Core. Oct. 12, 2010, https://www.renesas.com/en-hq/about/press-center/news/2010/news20101012a.html, last visited Aug. 9, 2017, 3 pp.

Achieving Real-Time Performance on a Virtualized Industrial Control Platform. http://https://www.intel.com/content/dam/www/public/us/en/documents/white-papers/industrial-solutions-real-timeperformance-white-paper.pdf, last visited Jul. 15, 2014, 7 pp.

Grugon, Chris, "The need for embedded virtualization in real-time, multiprocessor, multi-OS systems," http://embedded-computing.com/articles/the-multiprocessor-multi-os-systems/, last visited Jun. 2016, 7 pp.

(56) References Cited

OTHER PUBLICATIONS

Distributed control system software upgrade, NovaTech's updated DCS software, D/3 Version 15 {D3v15) adds features that are focused on modernizing configuration, improving operator interfaces, and facilitating reporting, http://www.controleng.com/single-article/distributed-control-system-software-upgrade/~24abcb53c6f4f851d05cd1f7293ea2c.html, last visited Apr. 5, 2016, 2 pp.

Thorve, Nitin et al., "Step-by-step guide to IBM Power Systems firmware update", License Internal Code {LIC) upgrade process, Mar. 26, 2013, https://www.ibm.com/developerworks/aix/tutorials/au-power-systems-1rmware-upgrade/au-power-systems-firmware-upgrade-pdf.pdf., 28 pp.

Feld, Joachim, "Profinet—Scalable Factory Communication for All Applications", Factory A10 Communication Systems, 2004. Proceedings. 2004 IEEE International Workshop, pp. 33-38 (2004).

Electrical and Instrumentation Loop Check, IEC Webstore International Electrotechnical Commission, Edition 2.0, pp. 42 (2012).

Hazarika, Pinku et al., "Mobile Cloud Integration for Industrial Data Interchange", Advances in Computing, Communications and Informatics (ICACCI), pp. 1118-1122 (2015).

European Search Report for Application No. 17908293.8, dated Dec. 8, 2020.

\* cited by examiner

INDUSTRIAL INTERNET CONNECTED CONTROL SYSTEM

RELATED APPLICATIONS

This application claims priority to U.S. Provisional Patent Application No. 62/435,610, filed Dec. 16, 2016, entitled "INDUSTRIAL INTERNET CONNECTED CONTROL SYSTEM," the entire contents and disclosures of which are hereby incorporated by reference herein in their entirety.

TECHNICAL FIELD

The disclosure generally relates to systems and processes in automation controls.

BACKGROUND

Embedded control systems ("control systems") are used in a wide variety of different field applications—for example, for utility operations such as power generation, power distribution, water/waste treatment, recycling, garbage processing, for manufacturing, for healthcare, for transportation, among others. For power generation, control systems can be used to control and monitor industrial assets such as power stations, turbines, motors, and the like. In healthcare, control systems can be used to control medical treatment and diagnostic equipment.

SUMMARY

Exemplified methods and systems are disclosed that facilitate a local embedded control device that can host in near-real-time, closed-loop processes with a cloud control infrastructure, while also controlling real-time processes for a plant asset under control. The closed-loop processes are conducted over a secure connection with secure operation between the local embedded control devices and the cloud control infrastructure. This architecture allows for the control of real-time processes for the plant asset using local data and, additionally, fleet data and other data available to the cloud control infrastructure (e.g., on the Internet and network) while securing against data breaches and cyber intrusions that can affect these real-time control processes.

In addition, the exemplified methods and systems discloses a local embedded control device with a local field agent (e.g., a standalone field agent) that securely executes thereon to serve as a gateway to the cloud control infrastructure for the near-real-time closed-loop processes. The local embedded control device is a multi-core hypervised platform that executes a real-time control engine in parallel with the local field agent to operate the deterministic real-time control processes in conjunction with the near-real-time closed-loop processes in a secure and cooperative manner. To this end, the local field agent operates with a real-time controller that executes the deterministic real-time embedded control processes to control the plant asset. The local field agent provides connectivity to the cloud control infrastructure, e.g., to store and forward data to the cloud, and to receive control data from the cloud. The local field agent further provides secure update and secure upgrade to the near-real-time closed-loop processes and the deterministic real-time embedded control processes. In some embodiments, the local field agent is cyber-hardened and includes no open "listening" ports, using pull-technology to exchange data with the cloud.

In some embodiments, both the local field agent and the real-time controller are executed in containerized environment to host local applications (e.g., industrial apps) developed for the asset. The platform's design segments the CPU such that real-time performance is guaranteed while also supporting the field agent functionality. The cloud control infrastructure and the local field agent operates together to manage all aspects of the control system. For example, the end user enrolls the control system into the cloud environment. From this cloud environment, the user is able to easily manage the control system.

In addition, the exemplified methods and systems discloses a cloud-based application to manage, e.g., via the cloud control infrastructure, updates and upgrades to these near-real-time closed-loop processes and deterministic real-time embedded control processes, via industrial apps (a.k.a., machine apps). The cloud-based application may include a portal that allows end-users to enroll a given control system into the cloud control infrastructure to manage such industrial apps, e.g., to update and to upgrade the near-real-time closed-loop processes, deterministic real-time embedded control processes, and base operating system (OS) and field agent services.

An apparatus (e.g., an embedded controller) is also disclosed. The apparatus includes a plurality of network interfaces, including a first network interface and a second network interface and a processor (e.g., a multi-core processor, e.g., a quad-core processor) with two or more independent processing units, including a first independent processing unit and a second independent processing unit. The apparatus further includes a memory having first instructions stored thereon (e.g., associated with a field agent), wherein execution of the first instructions, cause the first independent processing unit to: execute operations associated with a first operating system (e.g., Linux Ubuntu LTS); and communicate, via the first network interface, using bi-direction communication, with one or more platform computing devices (e.g., cloud platform, asset management system, storage area network). The memory has second instructions stored thereon (e.g., associated with real-time controller), wherein execution of the second instructions, cause the second independent processing unit to: execute real-time operations associated with a second operating system (e.g., real-time OS such as QNX, VxWorks, Integrity, RT Linux); and communicate, via the second network interface (e.g., via PROFINET, EGD, Modbus TCP, PROFIBUS, Genius, Device-net, Foundation Field-Bus, EtherCAT, CAN, CAN-Open, etc.), with one or more computing devices each having one or more sensors connected (e.g., one or more industrial controllers coupled to an industrial equipment, e.g., gas turbine, power generation equipment) (e.g., one or more healthcare imaging or diagnostics devices), wherein execution of the second instructions by the second independent processing unit is parallel and independent to the execution of the first instructions by the first independent processing unit.

In some embodiments, execution of the second instructions (e.g., to push data from the RT controller to the field agent), cause the second independent processing unit to transmit, via a local network interface located between the first independent processing unit and the second independent processing unit, data acquired from the communication with the one or more computing devices having the one or more sensors to a shared memory space accessible to the first independent processing unit, the first independent processing unit being configured, via the first instructions, to access the data stored in the memory space and to transmit, via the first network interface, the stored data, a portion thereof, or a derived parameter derived therefrom, to one or more computing devices associated with a cloud platform (e.g., for subsequent analysis such as by data analytics).

In some embodiments, execution of the first instructions (e.g., pull model of the field agent), cause the first independent processing unit to interrogate, via the first network interface, a pre-defined computing device (e.g., in the cloud platform) for updatable instructions selected from the group consisting of the first instructions associated with first operating system, first instructions associated with an application to be executed by the first independent processing unit, the second instructions associated with second operating system, second instructions associated with an application (e.g., control application) to be executed by the second independent processing unit; and, in response to determining presence of a given updatable instructions, i) retrieve, via the first network interface, and ii) store the given updatable instructions (wherein the given updatable instructions are subsequently used to update the first or the second instructions).

In some embodiments, execution of the first instructions (e.g., to perform filtering/processing of data at the field agent), cause the first independent processing unit to compare a difference between the stored data and a prior stored data to a pre-defined threshold; and, in response to determining the difference being outside the range of the pre-defined threshold, transmit the stored data to the one or more computing devices associated with the cloud platform.

In some embodiments, execution of the second instructions (e.g., to perform filtering/processing of data at the controller prior to making the data available to the field agent), cause the second independent processing unit to compare a difference between the acquired data to a prior data to a pre-defined threshold; and, in response to determining the difference being outside the range of the pre-defined threshold, transmit, via a local network interface located between the first independent processing unit and the second independent processing unit, data acquired from the communication with the one or more computing devices having the one or more sensors to a shared memory space accessible to the first independent processing unit, the first independent processing unit being configured, via the first instructions, to access the data stored in the memory space and to transmit, via the first network interface, the stored data, a portion thereof, or a derived parameter derived therefrom, to one or more computing devices associated with a cloud platform (e.g., for subsequent analysis such as by data analytics).

In some embodiments, the local network interface comprises a communication protocol selected from the group consisting of an Open Platform Communications (OPC) (formerly known as Object Linking and Embedding for process control (e.g., OPC-UA (OPC Unified Architecture)), MODBUS TCP (Transmission Control Protocol), and DDS (Data Distribution Service) for real-time systems.

In some embodiments, the first instructions (e.g., to execute an OPC client at the field agent), cause the first independent processing unit to execute operations associated with an OPC (Open Platform Communications) client.

In some embodiments, the second instructions (e.g., to execute an OPC server at the RT controller), cause the second independent processing unit to execute operations associated with an OPC (Open Platform Communications) server.

In some embodiments, the cloud platform is configured to perform subsequent analysis (e.g., data analytics) on the data received thereat from the apparatus.

In some embodiments, the second instructions (e.g., to execute a model or control application at the RT controller), when executed by the second independent processing unit, cause the second independent processing unit to execute operations associated with a model application or a control application for control of the computing devices having the one or more sensors.

In some embodiments, the first instructions (e.g., to execute a model or control application at the field agent), when executed by the first independent processing unit, cause the first independent processing unit to execute operations associated with a model application or a control application for control of the computing devices having the one or more sensors.

In some embodiments, the processor comprises a third independent processing unit (e.g., dual core or more on the field agent), the first instructions, when executed by the third independent processing unit, cause the third independent processing unit to, in combination with the first independent processing unit, perform the operations associated with the first operating system; and, communicate, via the first network interface, over the bi-direction communication, with the one or more platform computing devices.

In some embodiments, the processor comprises a fourth independent processing unit (e.g., dual core or more on the RT controller), wherein the second instructions, when executed by the fourth independent processing unit, cause the fourth independent processing unit to, in combination with the second independent processing unit execute the real-time operations associated with the second operating system; and, communicate, via the second network interface, with the one or more computing devices each having the one or more sensors.

In some embodiments, the processor comprises a number of processing cores selected from the group consisting of 2 cores, 3 cores, 4 cores, 6 cores, 8 cores, 10 cores, 12 cores, 14 cores, and 16 cores.

In some embodiments, the first instructions (e.g., to retrieve data from the cloud server to be used by a control application running on the RT controller), when executed by the first independent processing unit, cause the first independent processing unit to retrieve, via the first network interface, data from the one or more platform computing devices, the retrieved data being stored at a memory space accessible to the second independent processing unit, wherein the retrieved data is used in a control application executed by the second independent processing unit.

In another aspect, a system (e.g., an industrial-internet connected control system) is disclosed. The system includes a cloud platform; and a field agent configured to operatively communicate with the cloud platform and a real-time controller. The real-time controller is configured to execute one or more control applications to control one or more connected devices each having one or more sensors thereon, wherein the field agent and the real-time controller are each implemented on a processor having a plurality of independent processing units, wherein a first subset of the plurality of independent processing units executes the field agent, and wherein a second subset of the plurality of independent processing units executes, in parallel to the first subset, the real-time controller.

In another aspect, a method (e.g., to operate an industrial-internet connected control system) is disclosed. The method includes executing, at a first computing device, a real-time embedded controller for control of a connected equipment (e.g., one or more industrial controllers coupled to an industrial equipment) (e.g., one or more healthcare imaging or diagnostics devices); and executing a field agent that is communicatively coupled to the real-time embedded controller, the field agent being configured to communicate, via a network interface, over a bi-direction communication, with one or more platform computing devices (e.g., cloud platform, asset management system, storage area network), wherein the real-time embedded controller i) executes a first closed control loop via data collected from sensors associated with the real-time embedded controller and ii) executes a second closed control loop via data received from the one or more platform computing devices through the field agent.

In another aspect, a method (e.g., to update an industrial-internet connected control system) is disclosed. The method includes executing, at a first computing device, a real-time embedded controller for control of a connected equipment (e.g., one or more industrial controllers coupled to an industrial equipment) (e.g., one or more healthcare imaging or diagnostics devices), wherein the real-time embedded controller executes a first real-time control application; executing a field agent that is communicatively coupled to the real-time embedded controller, the field agent being configured to communicate, via a network interface, over a bi-direction communication, with one or more platform computing devices (e.g., cloud platform, asset management system, storage area network), wherein the field agent executes a second control application; interrogating, via the field agent, (e.g., on a periodic basis) a pre-defined computing device of the one or more platform computing devices for updatable instructions associated with either the first real-time control application or the second control application; and, in response to determining presence of a given updatable instructions, retrieving, via the field agent, the updatable instructions.

In some embodiments, the method includes updating the first real-time control application or the second control application based on the retrieved updatable instructions.

In some embodiments, the real-time embedded controller is implemented on one or more first independent processing units of a processor and wherein the field agent is implemented on one or more second independent processing units of the same processor, wherein the real-time embedded controller and the field agent are each configured to operate independently and in parallel to one another.

In some embodiments, the field agent executes first instructions associated with a first operating system, and wherein the real-time embedded controller executes second instructions associated with a second operating system, the first operating systems and second operating system each executing independent processes from one another (e.g., having services calls that are not invokable from the other operating system).

In some embodiments, the field agent is implemented in a second computing device.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED SPECIFICATION

Figure 1:
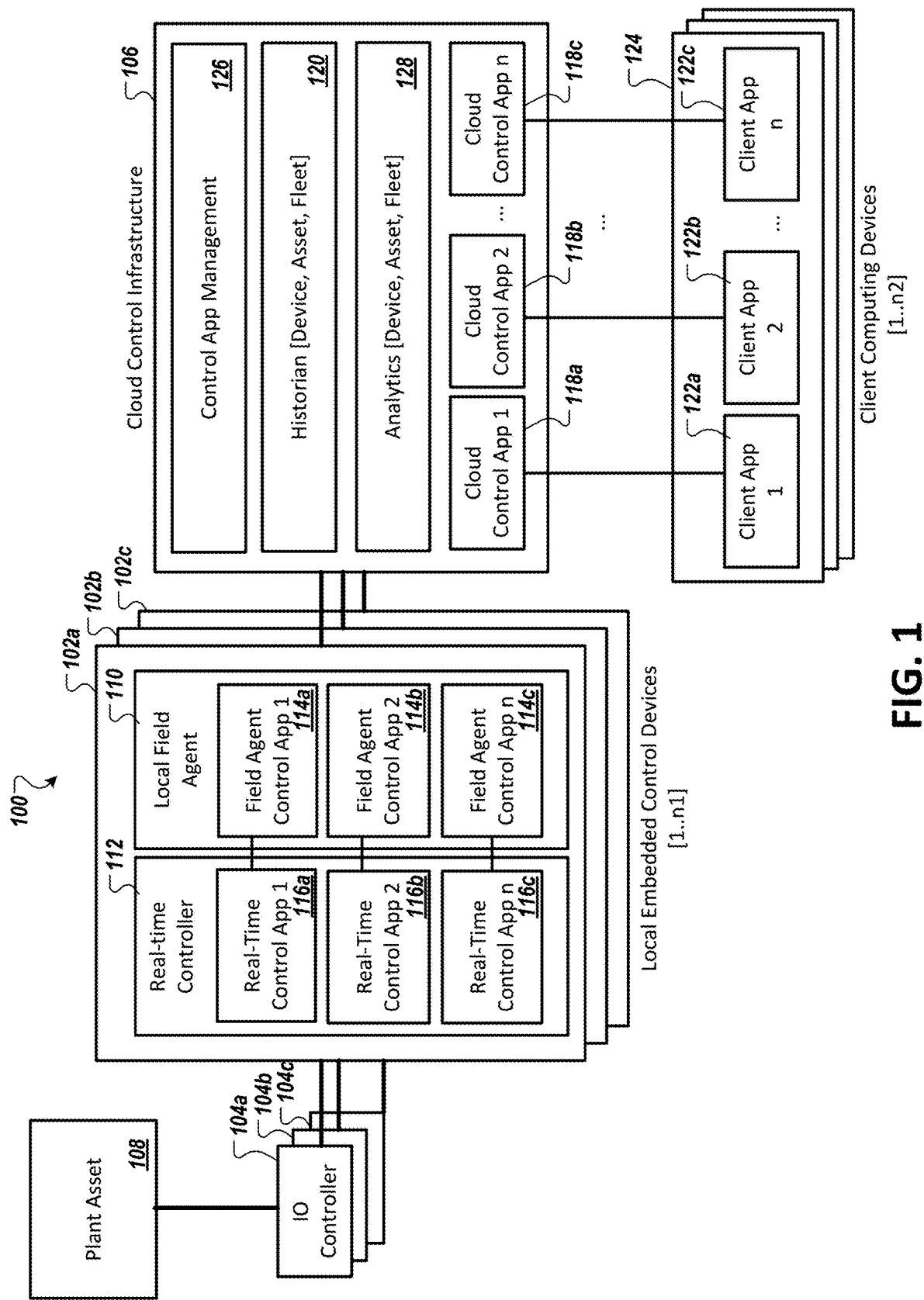
FIG. 1 illustrates an example industrial internet connected control system, in accordance with an illustrative embodiment.

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Approximating language, as used herein throughout the specification and claims, may be applied to modify any quantitative representation that may permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and interchanged; such ranges are identified and include all the sub-ranges contained therein unless context or language indicates otherwise.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program stored in memory for execution by personal computers, workstations, clients and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes. Disclosed are components that may be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that may be performed it is understood that each of these additional steps may be performed with any specific embodiment or combination of embodiments of the disclosed methods.

Industrial Internet

To leverage the power of the Industrial Internet, equipment data is collected and transmitted to the cloud. Operators can then visualize the performance of their assets and perform predictive analytics. Armed with this valuable information, operators can optimize equipment uptime and OEMs (original equipment manufacturers) can proactively maintain and service their equipment fleet, improving operations, growing service revenues and winning new business.

But bringing data from the plant to a cloud service is challenging. Data privacy, security, and IT infrastructure concerns often derail efforts to effectively gather and leverage asset information.

Industrial App

We live in a world of apps (software designed on mobile computing devices). Apps have become so pervasive in daily experience that we don't even think about it anymore. Now machines are joining the game. The industrial world is getting online fast—and Big Data is getting really big. Machine data is growing twice as fast as other data. Jet engines can generate 1 terabyte (1,000,000,000,000 bytes) of data per flight. Gas turbines, wind turbines, railway tracks and medical devices are beginning to produce gigantic quantities of data. By 2020, there will be an estimated 50 billion "things" connected to the Internet, and an increasing share of these interconnected devices will be industrial assets. As they get interconnected, industrial machines can do exactly as we do—they can rely on apps (namely, industrial apps, also can be referred to as machine apps) to do just about anything: improve their health (i.e., the machine's health), feed themselves better, socialize with each other (i.e., with other machines). Industrial apps, for example, can allow wind turbines to talk to each other and coordinate the way they change the pitch of their blades as the wind changes to maximize the power output of the whole wind farm. Industrial apps can be used to tell jet engines how to reduce their fuel consumption. Industrial apps can constantly check the health of gas turbines and predict when a fault is likely to happen—so people can intervene with preventive maintenance. Industrial apps can allow doctors and nurses to schedule medical procedures more efficiently and collaborate in real time on patients' diagnoses, curing people better and faster.

Industrial apps can bring greater efficiency throughout the economy. They can allow us (people) to produce more energy from renewable sources and use it more efficiently—spurring major changes in the energy industry. They can make healthcare better and more affordable. They can reduce delays in hospitals and airports. Combined with new production techniques, they can help develop manufacturing activities in new places, creating jobs and accelerating growth in emerging economies.

But developing apps for machines (as opposed to apps for consumers) is challenging. There can be interoperability and compatibility challenges. Industrial machines (for manufacturing, healthcare, transportation, utility operations, and the like) are very complex and they operate with other complex industrial machines.

What are needed are devices, systems, and methods that can address such challenges, among others.

Example Industrial Internet Connected Control System

FIG. 1 illustrates an example industrial internet connected control system 100, in accordance with an illustrative embodiment. The industrial internet connected control system (IICCS) 100 includes a number of local embedded control devices 102 (shown as 102a, 102b, and 102c) each configured to i) operate with one or more IO controllers 104

(shown as 104a, 104b, and 104c) to provide deterministic real-time control processes for a plant asset 108 and ii) operate with a cloud control infrastructure 106, in some embodiments, to execute a near real-time close-loop processes that provides data to the deterministic real-time control processes. The local embedded control devices 102 facilitates controls of plant assets via secure and deterministic access to historian plant-asset data, fleet data, and other data available to the cloud control infrastructure 106. Analytics and algorithms running both locally on the control system and within the cloud utilize this data to more intelligently control the asset for better asset utilization for the end customer (i.e., plant asset operator). Analytics such as machine Analytics can include services associated with the discovery, interpretation, and communication of meaningful patterns in machine data.

In some embodiments, the system 100 combines both i) Information Technologies (IT), operating at the cloud, that can include Virtualization, Big Data, Analytics, Scalability, Software Defined Networking, Security and Privacy and ii) Operations Technologies (OT), operating at the embedded control devices, that can include Closed Loop Control, Real-time, Safety, Reliability, Stability, Machine Connectivity and Data Acquisition, Human Machine Interface.

Examples of plant assets include, for example, but not limited to: equipment and machines used in power generation (e.g., gas turbines, wind turbines, solar power converters, stream turbine, nuclear reactors, plant controls, etc.), in power distribution (e.g., sub-station equipment, transmission equipment, etc.), in water and waste treatment (e.g., pumps, motors, relays, etc.), in recycling, in garbage processing (e.g., furnaces, conveyor system, sorters, etc.), in manufacturing (e.g., automation equipment, warehouse equipment, etc.), in healthcare (e.g., diagnostics equipment, imaging systems, lab equipment, etc.), in transportation (e.g., jet engines, locomotive engines, vehicles, cargo containers, cargo vessels, cargo trucks, freight transport, road vehicles, etc.), in refining, in mining (e.g., excavation equipment, etc.), in oil exploration (e.g., well equipment), in natural gas exploration (e.g., well equipment), in pipeline infrastructure (e.g., pumps, valves, monitoring equipment, etc.), in data centers (e.g., cooling equipment, etc.), among others. Plant asset operator can be people that operates the plant asset, that services the plant asset, that owns the plant asset, and any other stakeholders associated with the plant asset.

The IO controller 104 can interface with field devices that can measure and/or control the flow of air, steam, water, and gas. Examples of field devices include, but are not limited to, contact switch devices, temperature sensors or regulator devices, current and/or voltage sensors or regulator devices, fluid sensing sensors or regulator devices, air velocity sensors or regulator devices, inverter drives, pressure sensors or regulator devices, relay devices, panel products, signal converters, valves control, actuators, motors, drives, network connectivity, among others.

Referring still to FIG. 1, the local embedded control device 102 includes a local field agent 110 and a real-time controller 112. In some embodiments, the local embedded control device 102 executes a near real-time open-loop processes (e.g., to provide data associated with the plant asset 108 and other devices connected therebetween) with the cloud control infrastructure 106 (e.g., for analysis). In some embodiments, the local field agent 110 provides, via local high speed connection, access to controller data acquired via the real-time controller 112 and provides, via connectivity to the cloud, links to connect assets to the industrial internet. The data access in combination with the ability to run analytics and algorithms, locally or cloud-based, yields an industrial internet connected control system (e.g., 100). In some embodiments, the local field agent 110 is a secure, preconfigured gateway that is deployed across distributed fleets of assets to collect data from a plant asset to cloud control infrastructure and to provide control data from the cloud control infrastructure to a real-time controller. In some embodiments, the local field agent 110 provides a rich domain application environment for edge processing, so logic can be executed at the most appropriate place (or places) in the architecture—e.g., locally on the machine or in the cloud.

In some embodiments, local embedded control devices 102 include devices such as, but not limited to, programmable automation control (PAC) device, programmable logic controller (PLC), supervisory control and data acquisition (SCADA), Remote Terminal Units (RTU), among others.

Although the local embedded control device 102 is shown in FIG. 1 as a single device with the local field agent 110 and the real-time controller 112 integrated in a single device, in some embodiments, the local embedded control device 102 is implemented as an independent local field agent 110 and an independent real-time controller 112.

In some embodiments, and as shown in FIG. 1, the local field agent 110 serves as a secure gateway to the cloud control infrastructure 106 and is configured to execute a plurality of field agent control applications 114 (shown as "Field Agent App 1" 114a, "Field Agent App 2" 114b, and "Field Agent App n" 114c) that operates in connection with the real-time control applications 116 (shown as "Real-Time Control App 1" 116a, "Real-Time Control App 2" 116b, and "Real-Time Control App n" 116c) which executes on the real-time controller 112. At the cloud control infrastructure, cloud control applications 118 (shown as "Cloud Control App 1" 118a, "Cloud Control App 2" 118b, and "Cloud Control App n" 118c). The cloud control application 118, in some embodiments, operates with client applications 122 (shown as "Client App 1" 122a, "Client App 2" 122b, and "Client App n" 122c) that provides visualization of the collected data associated with the plant asset 108 and of the analytics derived therefrom. In some embodiments, the client applications 122 are executed on client computing devices 124.

Outcome-Optimized Control

Field agent control applications 114, real-time control applications 116, and cloud control applications 118, in some embodiments, collectively, provides an outcome-optimized control loop. Conventional embedded controllers execute deterministic real-time control processes (e.g., in a feedback loop) to control (or optimize) based on an observable state relating to a sensor input of the embedded controller or a model executing thereat. Outcome-optimized control loop executes both i) a first control process that is deterministic and in real-time to control based on the sensor input of the embedded controller or a model executing thereat and ii) a second control process that is near-real-time to control (or optimize) based on a second observable state, preferably in conjunction with the cloud control infrastructure, based on one or more outcome parameters. This type of control provides an adjustable controls tailored to changing needs of the plant operator that, e.g., take into account economics, cost, maintenance cycles, and etc.

Case Study #1—Combined Cycle Power Plant

Take, for example, a combined cycle power plant, outcome-optimized control loop can assess outcome-based observable states for economic, cost, and/or maintenance cycle, among others. The key physical inputs are still observable states relating to metrics such as operating temperature, operating pressure, e.g., in the hot-gas path. The outcome-based observable states can be used to understand the impact of life, efficiency, and profit and allow a plant operator to optimize on one or more of these outcome-based states. So, rather than optimizing on minimizing fuel usage and on operating efficiency point, for example, factors such as electricity price in the market, gas price, his outage dates can be leveraged. For example, by operating the plant "hot", the gas turbine may consume a least amount of fuel (for a same power output) while putting standard wear on the parts life; and by operating the plant "cold", the gas turbine may consume more fuel (for the same power output) while putting less wear on the part as compared to running the plant "hot". By looking at the plant operations, e.g., over a 3 year horizon, the controller can optimize based on a metric, such as customer profits (taking into account fuel cost, expected maintenance cost, expected life, and etc.). In some instances, for operation of certain complex machines, the optimization may be selected from over 1032000 potential opportunities.

Case Study #2—Water Treatment

A simple example that illustrates the value of a connected control system is a water utility. They move water around the facility during normal operation. Moving this water require running pumps that consume electricity. Having a control system that understands the current electricity price allows the utility to marry this data with the real-time control engine. The pricing data facilitates intelligent decisions concerning when is the best time (cost vs plant operation) to move this water within the utility.

Referring back to FIG. 1, although FIG. 1 shows equal numbers of field-agent control applications 114, real-time control applications 116, and cloud control applications 118, it is contemplated that certain cloud control application 118 (or a set thereof) can operate with more than one field agent control applications 114. Similarly, certain field agent control application 114 can (or set thereof) operate with more than one real-time control applications 116. In addition, it is contemplated that certain real-time control application 116 (or a set thereof) can operate with more than one field agent control applications 114. And, certain field agent field control application 114 (or a set thereof) can operate with more than one cloud control applications 118.

Referring still to FIG. 1, the deterministic real-time closed-loop processes and the near-real-time control processes are conducted over a secure connection between the local embedded control devices 102 and the cloud control infrastructure 106 using pull technology to cyber-hardened the local embedded control devices 102 and the cloud control infrastructure 106.

In some embodiments, the local field agent 110 is configured with no open "listening" ports in which processes and control applications executing thereon directly connect to pre-defined secured computing devices (e.g., platform computing devices) at the cloud control infrastructure 106. In some embodiments, and as shown in FIG. 1, the cloud control infrastructure 106 executes a historian operation 120. To this end, data associated with control of the plant asset 108, in some embodiments, are periodically transmitted from the local embedded control device 102, via the local field agent 110, to the historian operation 120 executing on the cloud control infrastructure 106. Processes to filter, encode, encrypt is performed at the local field agent 110, in some embodiments. In other embodiments, these processes are performed at the real-time controller 112, or at the real-time controller 112 in conjunction with the local field agent 110.

The historian operation 120, in some embodiments, is executed on a storage area network (SAN). In other embodiments, the historian operation 120 is executed on a cloud storage platform (e.g., Amazon S3, Microsoft Azure, and the like). In other embodiments, the historian operation 120 is executed on enterprise servers in a private cloud or a hybrid cloud infrastructure. Data collected, via the historian operation 120, may be analyzed at the cloud control infrastructure to control the asset, e.g., to assess maintenance schedules, monitor performance of a given plant asset to a fleet, and etc.

Near-Real-Time Cloud-Control Closed Loop

Figure 2:
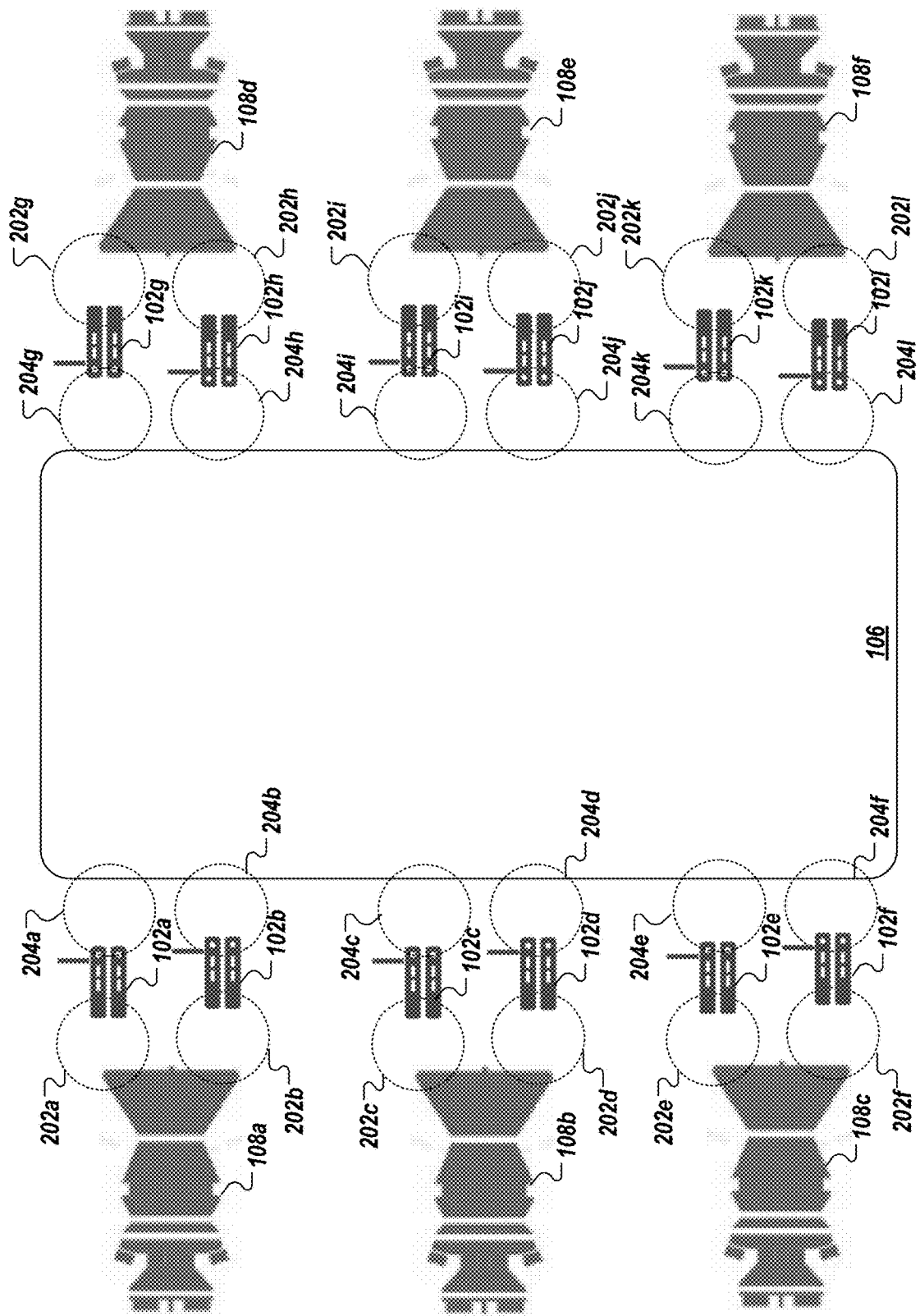
FIG. 2 is a diagram of near real-time cloud-control closed-loop operations for a fleet of plant assets, in accordance with an illustrative embodiment.

FIG. 2 is a diagram of near real-time cloud-control closed-loop operations for a fleet of plant assets 108, in accordance with an illustrative embodiment. As shown in FIG. 2, the fleet of plant assets 108 (shown as 108a-108f) interfaces to local embedded control devices 102a-102l. Each local embedded control devices (e.g., 102a-102l) executes a deterministic real-time embedded control process 202 (shown as 202a-202l) with a given plant asset (e.g., 108a-108f) and a near-real-time control process 204 (shown as 204a-204l) with the cloud control infrastructure 106.

In each of the deterministic real-time embedded control process (shown as 202a-202l) and in each of the near-real-time control process (e.g., 204a-204l), there is an observable action (e.g., collect sensor data about a state of a controlled process, e.g., through an input module and/or perform processing/filter on collected data), a determining action (compute an action, e.g., setting a new setpoint, for the equipment or process and/or executing a model, etc.), and a performing the action (e.g., outputs the next set of instructions for actuators, e.g., adjust control setpoint). The deterministic real-time embedded control process 202 has an associated time in the micro-second range, e.g., about 1000 us, about 500 us, about 100 us, about 50 us, about 10 us, about 1 us, less than 1 us, and etc. The near real-time control process 204 has an associated time in the micro-second range, e.g., about 1 s, about 10 s, about 15 s, about 30 s, about 60 s, about 5 minutes, or greater. To this end, within every period of the associated time of the deterministic real-time embedded control process 202, a set of pre-defined processes, services, or set of instructions are executed in a guaranteed manner. In addition, within every period of the associated time of the near real-time control process 204, a set of pre-defined processes, services, or set of instructions are executed in a guaranteed manner.

It is contemplated that near real-time control process 204 can be performed at a unit level (namely, for a given local embedded control device 102), at a plant level (namely for a set of local embedded control devices 102 associated with a given plant asset 108), and at a fleet-level (namely for a set of local embedded control devices 102 associated with a set of plant assets 108).

Example Local Embedded Control Device with Multi-Core Hypervised Platform

Figure 3:
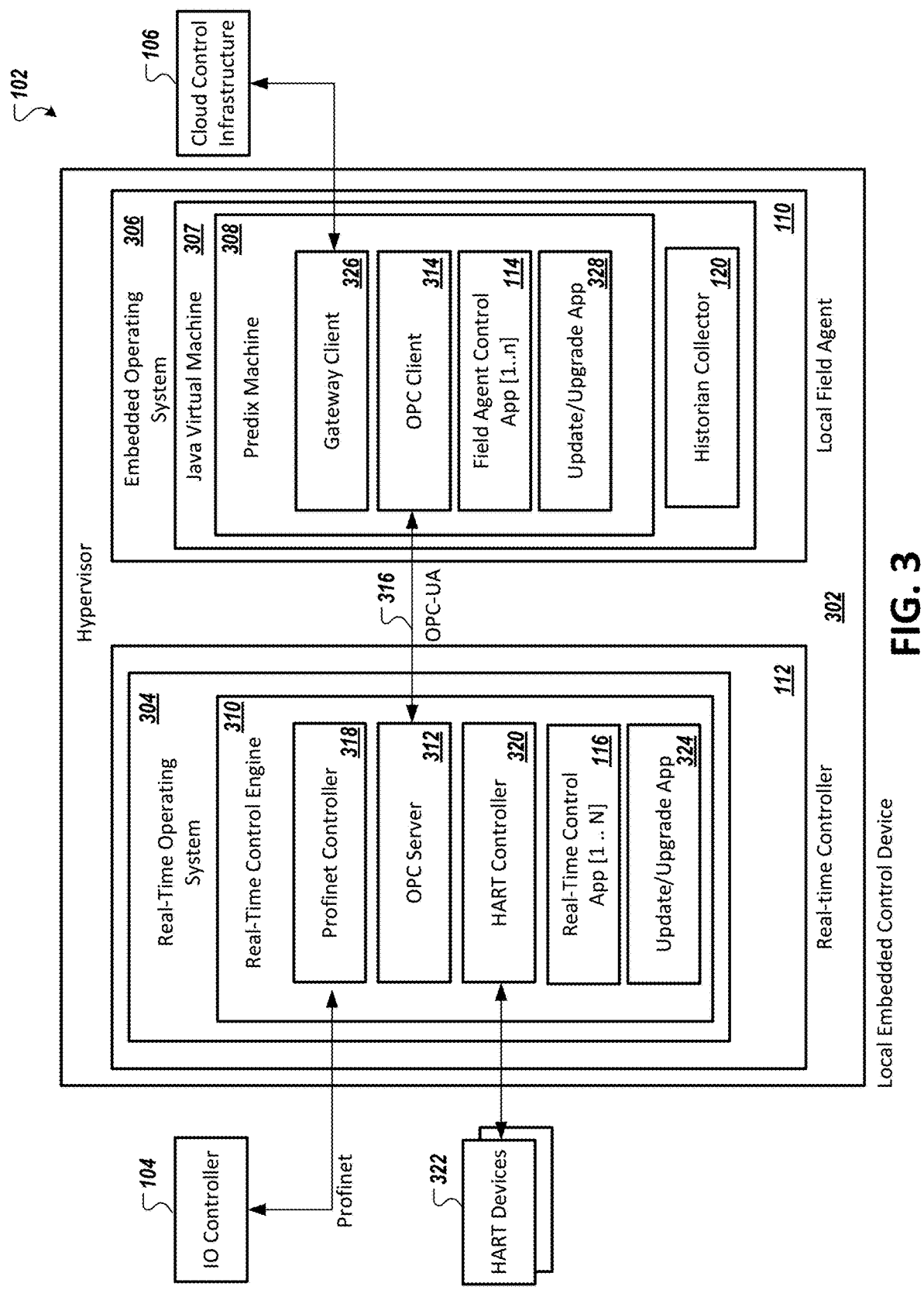
FIG. 3 is a diagram of a Local Embedded Control Device with a hypervised platform, in accordance with an illustrative embodiment.

FIG. 3 is a diagram of a local embedded control device 102 with a hypervised platform 302, in accordance with an illustrative embodiment. As shown in FIG. 3, the hypervised platform 302 provides for execution of independently-operating operating systems, including a real-time operating system 304 and an embedded operating system (OS) 306. That is, each independently-operating operating system may have services calls that are not invokable from, or by, the other operating system.

The real-time operating system 304 is an operating system that executes deterministic real-time processes such that the jitter (i.e., the level of consistency to accept and complete a task or service) is guaranteed. Examples of real-time operating system includes, but not limited to, QNX Neutrino, Android, Ubuntu, Green Hills Software INTEGRITY, Debian Linux, among others.

In some embodiments, and as shown in FIG. 3, the embedded operating system 306 executes a Java Virtual Machine (JVM) 307 to execute Java-based programs and services from a cloud gateway environment 308 (shown as "Predix Machine" 308). The cloud-interface environment provides a cloud gateway environment for, among other things, the field agent control applications 114, e.g., to exchange data with the cloud-based services operating at the cloud control infrastructure and to manage many, if not all aspects of, local embedded control device 102 with regard to connectivity, security, configuration, upgrades and updates, and other services, and to manage the plant-assert control application (shown as "Field Agent Control App [1 . . . n]" 114) over such services. In some embodiments, the cloud gateway environment 308 is Java-based, or compatible with Java, to allow services to be developed in such environment. Other environments can be used in other embodiments.

In some embodiments, and as shown in FIG. 3, the local field agent 110 executes a gateway client 326 to exchange data with the cloud-based services operating at the cloud control infrastructure 106. The gateway client 326 securely connects with the cloud-based services over secure ports in the local field agent 110. In some embodiments, the gateway client 326 have no "open" listening ports and communicates with external networks services (such as cloud-based services operating on the cloud control infrastructure 106) using pull requests. That is, each data exchange includes a request for the transmission of information being initiated by the local field agent 110. In other embodiments, the gateway interface 326 is configured as a server.

In some embodiments, and as shown in FIG. 3, the local field agent 110 executes a local network interface 314 to exchange data with the real-time controller 112. In some embodiments, the local network interface 314 exchange data, with the real-time controller 112, according to an Open Platform Communications (OPC) (formerly known as Object Linking and Embedding for process control (e.g., OPC-UA (OPC Unified Architecture)). In some embodiments, and as shown in FIG. 3, the local network interface 314 is implemented as a client (shown as "OPC Client" 314) that communicates, via a OPC exchange 316 (shown as "OPC-UA" 316) with a corresponding interface 312 (shown as "OPC Server" 312) executing on the real-time controller 112. It is contemplated that other configurations for the interface may be used (e.g., 312 as a client and 314 as a server). It is contemplated that other protocols may be used. In other embodiments, the local network interface exchange data, with the real-time controller 112, using MODBUS TCP/IP. Other examples of protocol used by the local network interface includes the DDS (data distribution service) for real-time systems, and the like. DDS is an Object Management Group (OMG), machine-to-machine standard that uses a "publish—subscribe" pattern to facilitate scalable, real-time, deterministic, and interoperable data exchanges. The OPC Unified Architecture (OPC UA) is an industrial M2M (machine-to-machine) communication protocol for interoperability developed by the OPC Foundation. Modbus TCP/IP is a Modbus RTU protocol with a TCP interface that runs on Ethernet. The Modbus messaging structure is the application protocol that defines the rules for organizing and interpreting the data independent of the data transmission medium.

In some embodiments, and as shown in FIG. 3, the local field agent 110 executes a secure update or upgrade application 328 (shown as "Update/Upgrade App 328"). The secure update or upgrade application 328, in some embodiments, is configured to poll a cloud based service, on an intermittent basis, to determine if an update instance exists for any services or for any applications (e.g., 114, 314, 326, 328, etc.) executing at the local field agent 110 and for any applications (e.g., 116, 312, 318, 320, 324, etc.) executing at the real-time controller 112. To this end, upon determining an update instance exists (in some embodiments, the determination may be based on a determination of one or more new app files), the local field agent 110 can initiate transfer of the identified one or more new app files to the local field agent 110 (specifically, to a memory thereon). In some embodiments, the exchange includes a pre-defined time to perform the update or upgrade. In other embodiments, the local field agent 110 includes a pre-defined configuration on when to perform the update or upgrade. In some further embodiments, the local field agent 110 notifies the end user that the update instance exists. The end user schedules the update based on when it is appropriate for the plant.

In some embodiments, the secure update or upgrade application 328 is configured to update or upgrade the services or applications executing on the real-time controller 112. To update or upgrade services or applications executing on the real-time controller 112, in some embodiments, the secure update or upgrade application 328 triggers the real-time controller 112 to enter a standby mode, e.g., before updating the run-time files executing thereat. Once complete, the secure update or upgrade application 328 may trigger the real-time controller 112 to reset or to reboot, in certain applications. In other embodiments, the secure update or upgrade application 328 may trigger the real-time controller 112 to exit standby mode and restart the updated or upgraded services or applications with the updated run-time files. The secure update or upgrade application 328 of the local field agent 110 may operate with an update or upgrade application 324 executing on the real-time controller 112.

In some embodiments, and as shown in FIG. 3, the real-time controller 112 executes deterministic services and/or applications to perform control (e.g., closed-loop control), over an interface 318 (shown as "Profinet Controller" 318) with the IO controller 104. The IO controller 104 includes input-output interfaces to actuators and sensors associated with the plant asset 108 (not shown—see FIG. 1). Profinet is a standard for data communication over Industrial Ethernet that facilitates, among other things, collection of data from, and control of, equipment in industrial systems. In some embodiments, data exchange can be performed at a cycle time of less than 1 ms (milli-seconds) or less.

In other embodiments, the real-time controller 112 executes other standards, to communicate with the IO controller 104, such as MODBUS TCP/IP, EGD (Ethernet Global Data protocol), PROFIBUS, Genius, Device-net, Foundation Field-Bus, EtherCAT, CAN (Controller Area Network protocol), and CANopen. In some embodiments, Modbus is used to conduct data exchange with imaging system.

In some embodiments, and as shown in FIG. 3, the real-time controller 112 executes a second interface (shown as "HART Controller" 320) to perform data exchange with other input-output interfaces of HART devices 322 connected to the plant asset 108. In some embodiments, the HART devices 322 interfaces to the IO controller 104. The HART Communication Protocol (Highway Addressable Remote Transducer) is a hybrid analog and digital industrial automation protocol that can, among other things, communicate over legacy 4-20 mA analog instrumentation current loops.

Example Local Embedded Control Device with Multi-Core Hypervised Platform

Figure 4:
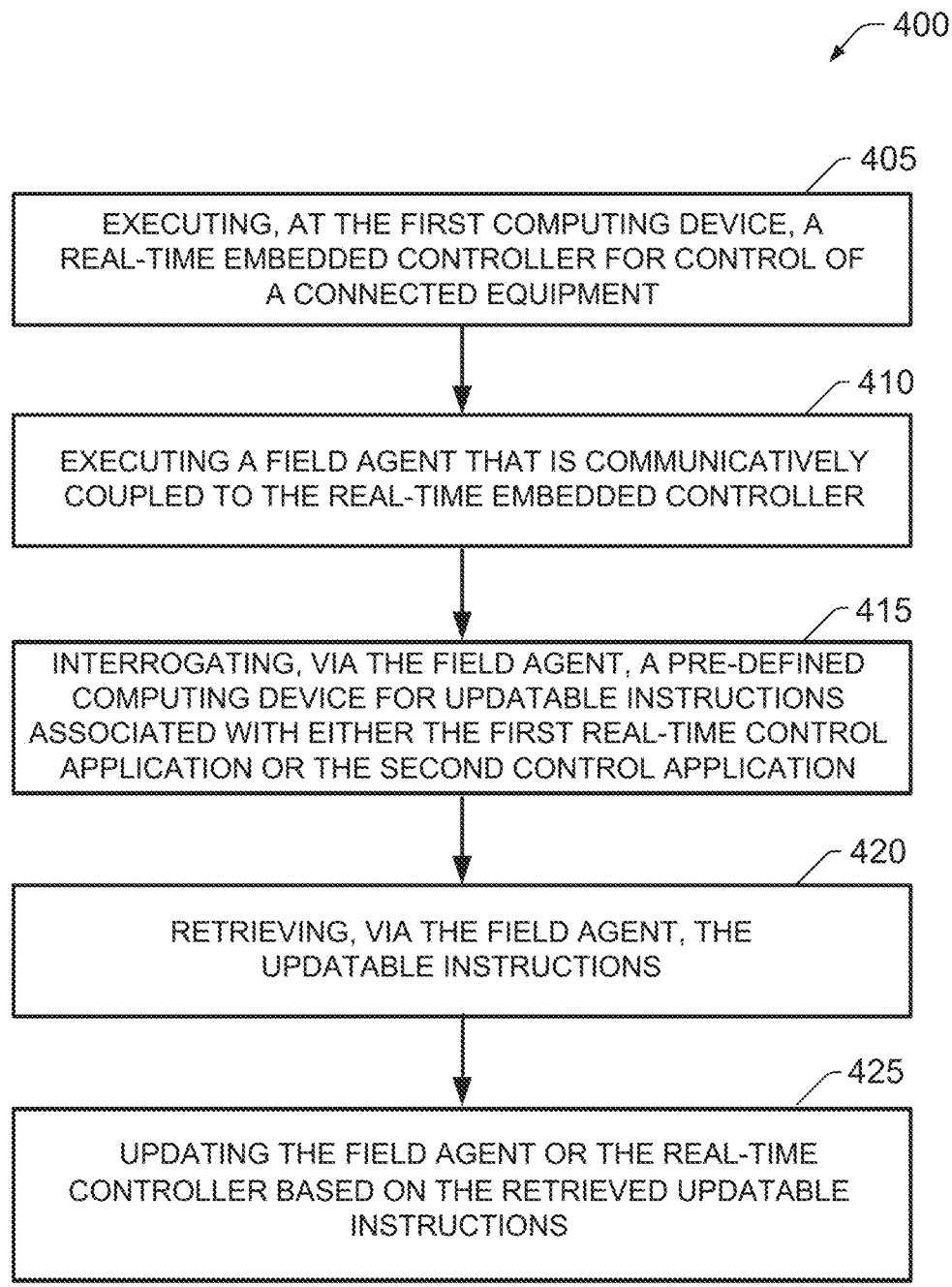
FIG. 4 illustrates a flow chart of an exemplary computer-implemented process for executing near real-time cloud-control closed-loop operations as shown in FIG. 2.

FIG. 4 illustrates a flow chart of an exemplary computer-implemented process 400 for executing near real-time cloud-control closed-loop operations as shown in FIG. 2. Process 400 may be implemented by a computing device, for example real-time controller 112 or local field agent 110 executing on local embedded control device 302.

In the exemplary embodiment, the local embedded control device 302 executes 405 the real-time embedded controller 112 for control of a connected equipment, such as HART devices 322. The real-time embedded controller 112 executes a first real-time control application.

In the exemplary embodiment, the local embedded control device 302 executes 410 the field agent 110 that is communicatively coupled to the real-time embedded controller 112. The field agent 110 is configured to communicate, via a network interface, over a bi-direction communication, with one or more platform computing devices included in cloud control infrastructure 106. The field agent 110 executes a second control application;

In the exemplary embodiment, the local embedded control device 302 interrogates 415, via the field agent 110, a pre-defined computing device of the one or more platform computing devices 106 for updatable instructions associated with either the first real-time control application or the second control application. In response to determining presence of a given updatable instructions, the local embedded control device 302 retrieves 420, via the field agent 110, the updatable instructions.

In some embodiments, the local embedded control device is further configured to update 425 the field agent or the real-time controller based on the retrieved updatable instructions.

In some embodiments, the real-time embedded controller 112 is implemented on one or more first independent processing units of a processor. In these embodiments, the field agent 110 is implemented on one or more second independent processing units of the same processor. The real-time embedded controller 112 and the field agent 110 are each configured to operate independently and in parallel to one another.

In some further embodiments, the field agent executes 110 first instructions associated with a first operating system. The real-time embedded controller 112 executes second instructions associated with a second operating system. The first operating system and second operating system each execute independent processes from one another.

In some still further embodiments, the field agent 110 is implemented in a second computing device.

Example Local Embedded Control Device with Multi-Core Hypervised Platform

Figure 5:
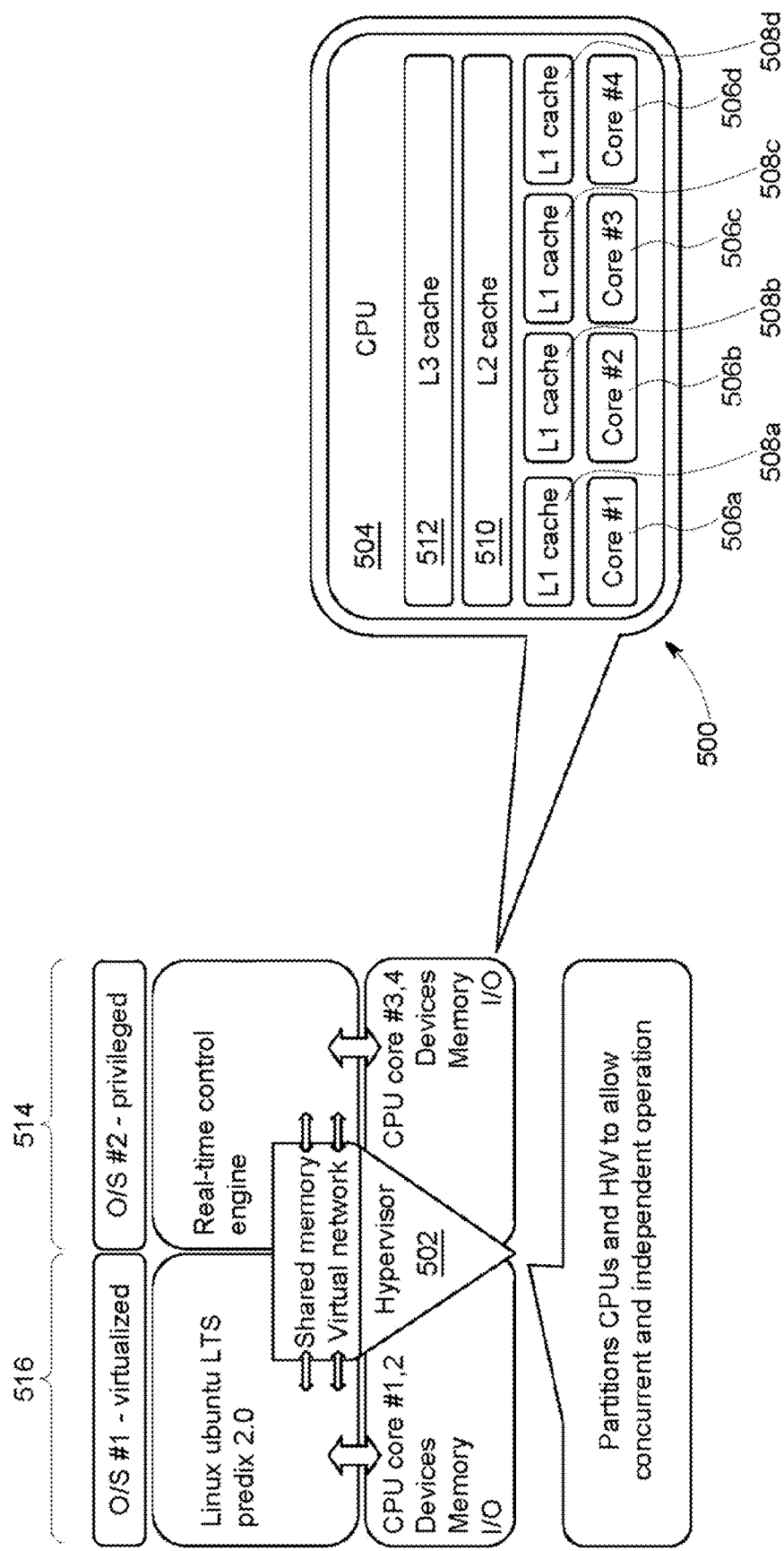
FIG. 5 shows an example local embedded control device with multi-core hypervised platform, in accordance with an illustrative embodiment.

FIG. 5 shows an example local embedded control device 102 with multi-core hypervised platform 500, in accordance with an illustrative embodiment. The multi-core hypervised platform 500 facilitates the real-time controller 112 (also referred to as a "real-time control engine") which runs in parallel with the local field agent 110. The real-time controller 112 is responsible for controlling the asset while the local field agent 110 provides connectivity to the cloud, asset management, store and forward data to the cloud, and containerized environment to host local applications developed for the asset. The platform's hypervised design segments the CPU such that real-time performance is guaranteed while also supporting the field agent functionality. The multi-core hypervised platform allows for implementation of a miniaturized local embedded control device 102 with a small-footprint board design that allows for smaller control cabinets to be used. Particularly for industrial environment, smaller controller cabinets are desired.

As shown in FIG. 5, a multi-core hypervised platform 500 includes a multi-core processor 504 (or CPU 504) with two or more independent processing units 506 (shown as "Core #1" 506a, "Core #2" 506b, "Core #3" 506c, and "Core #4" 506d). In some embodiments, and as shown in FIG. 5, each independent processing unit 506 operates with a corresponding L1 Cache 508 (shown as 508a, 508b, 508c, and 508d) and to a shared L2 Cache 510 and a shared L3 Cache 512.

As shown in FIG. 5, a hypervisor 502, which is similar to hypervisor 302 shown in FIG. 3, segments the CPU 504 (e.g., as a quad-core processor) into two independent virtualized environment shown as a privileged environment 514 (shown as "O/S #2—Privileged" 514) that executes the real-time control engine and as a virtualized environment 516 (shown as "O/S #1—Virtualized" 516) that executes the local field agent 110. Each of the two independent virtualized environment interfaces to device peripheral, memory, and IO of the CPU 504. The partitioned CPU and hardware facilitates concurrent, independent operations for deterministic real-time embedded control processes of the real-time controller 112 from the processes of local field agent 110. To this end, the real-time controller 112 can execute the deterministic real-time embedded control process 202 while allowing the local field agent 110 to execute the near real-time control process 204 with the cloud services in the cloud control infrastructure 106. In some embodiments, hypervisor 502 provides a throttle to minimize virtualized O/S impact on the shared cache.

In some embodiments, the privileged environment 514 is configured to execute real-time operations associated with a real-time operating system and communicate, via the interface (e.g., 318, 320), with the IO controller 104 or devices (e.g., 322) that is operatively coupled to the plant asset 108. And, the virtualized environment 516 is configured to execute operations associated with the a second operating system (e.g., Linux Ubuntu LTS, Window CE) and communicate, via the interface, over a bi-direction communication, with one or more platform computing devices (e.g., cloud platform, asset management system, storage area network) of the cloud control infrastructure 106.

In some embodiments, and as shown in FIG. 5, the hypervisor 502 (via shared memory and virtual network) facilitates transmission of data acquired, via the real-time controller 112 from the communication with the IO controller 104 to a shared memory space accessible to both i) the first independent processing unit (e.g., 506a and 506b) operating the privileged environment 514 and ii) the second independent processing unit (506c and 506d) operating the virtualized environment 516. In some embodiments, processing of data (such as filtering) can be performed prior to the data being transmitted to the cloud platform, for example, for subsequent analysis such as by data analytics.

Example Local Embedded Control Device Hardware

Figure 6:
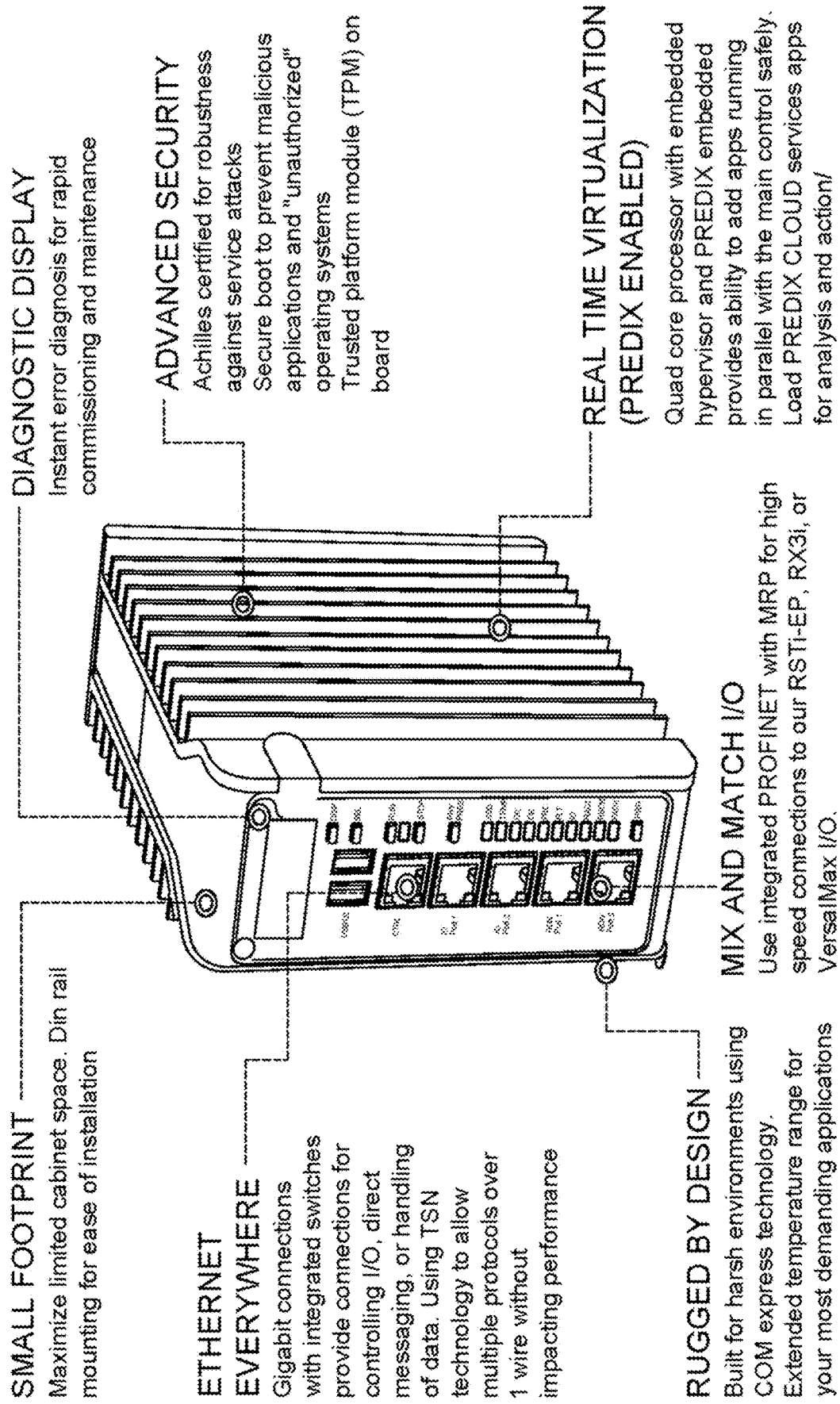
FIG. 6 is a diagram of a local embedded control device with a hypervised platform, e.g., as described in relation to FIG. 5, in accordance with an illustrative embodiment.

FIG. 6 is an example local embedded control device 102, in accordance with an illustrative embodiment. In some embodiments, and as shown in FIG. 6, the local embedded control device 102 may have a small footprint, e.g., to maximize limited cabinet space, while also providing mounting support (e.g., for DIN rails) to facilitate ease of installation of the local embedded control device 102. The local embedded control device 102 is preferably built for harsh environment, e.g., using COM Express architecture, and that can operate in extended temperature ranges for demanding industrial applications. It is contemplated that other ruggedized standard may be used.

In some embodiments, and as shown in FIG. 6, the local embedded control device 102 includes a number of Gigabit connections to provide connections for controller I/O, direct messaging, or handling of data. In some embodiments, the local embedded control device 102 executes Time Sensitive Networking (TSN) protocols to allow multiple protocols to operate over a single set of wires.

In some embodiments, and as shown in FIG. 6, the local embedded control device 102 includes a quad-core processor with embedded hypervisor 302 and cloud gateway environment 308 to facilitate execution and update/upgrade of field agent control applications 114 that can execute in parallel to the main control (e.g., real-time control applications 116). In some embodiments, the processor can include a number of processing cores selected from the group consisting of 2 cores, 3 cores, 4 cores, 6 cores, 8 cores, 10 cores, 12 cores, 14 cores, and 16 cores. The field agent control applications 114 may include service apps, e.g., for analysis and action.

In some embodiments, and as shown in FIG. 6, the local embedded control device 102 includes advanced security and is, e.g., Achilles certified for critical communication robustness testing of the Virtual Machine (VM) against service attacks. In some embodiments, secure boot operation is used to prevent malicious application and unauthorized operating systems services from being executed. In some embodiments, secure boot operations include validating the firmware and validating the image and boot instructions, e.g., for the hypervisor, the real-time operating system, for the kernel instructions, and etc. In some embodiments, a Trusted Platform Module comprising a secure crypto-processor, which is a dedicated microcontroller designed to secure hardware by integrating cryptographic keys into devices, operates with the CPU (e.g., 504a-504d) operates in accordance with the Trusted Platform Module (TPM) standard.

In some embodiments, and as shown in FIG. 5, the local embedded control device 102 includes IO interface, e.g., that operates Profinet, to provide high-speed data exchange with the IO controllers 104.

Cloud Control Infrastructure

In another aspect, the cloud and the field agent work together to manage all aspects of the control system. For example, in some embodiments, a plant asset operator can enroll the control system into the cloud environment. From this cloud environment, the user is able to easily manage the control system. In some embodiments, the cloud environment provides a cloud-based graphical user interface to manage the real-time and field control applications desired to be executed (e.g., firmware and application program). In some embodiments, the cloud environment provides a cloud-based graphical user interface to manage all aspects of end-user local applications. In some embodiments, the cloud environment provides a cloud-based graphical user interface to execute or manage the cloud and local analytics to run, and the field agent environment (O/S and Base Field Agent Services).

This management ability facilitates or assists plant asset operators in quickly understanding the control systems that are in the field and to apply updates, e.g., to the controls and to respond, or guard against, cyber threats.

In some embodiments, the local field agent 110 is configured to interrogate (e.g., on a periodic basis) a pre-defined computing device or services in the cloud control infrastructure for updatable instructions associated with either the real-time control application or the field agent control application. In response to determining presence of a given updatable instructions, the local field agent 110 is configured to retrieve the updatable instructions and to update the retrieved updatable instructions.

The cloud control infrastructure 106 can combine service associated with i) edge software to provide connectivity and communication between edge devices (102, 104), ii) data management to coordinate services for efficient data storage and modeling, iii) security, iv) analytics to run key complex analysis algorithms on data sets associated with the plant asset, v) DevOps to manage building, testing, and deploying of your applications and services, vi) Mobile to develop Industrial Internet mobile apps that function effectively even offline.

Referring back to FIG. 1, the cloud control infrastructure 106 includes a control application management environment 126 (shown as "Control App Management" 126) to enroll the control system into the cloud environment. The control application management environment 126, in some embodiments, includes a manager for device management. The manager, in some embodiments, allows for the creating/updating/deleting of device groups, and the adding/deleting of devices. In some embodiments, the device manager can provide, via a graphical interface, device summaries. In some embodiments, the device manager can allow a plant asset operator to assign identifiers associated with technicians to a given plant asset or local embedded control device. In some embodiments, the device manager provides a portal to open a secure tunnel (e.g., SSH tunnel) to remote devices. In some embodiments, the device manager allows for creation and execution of custom commands or scripts. In some embodiments, the device manager can provide commands to devices to notify output or error reasons.

The control application management environment 126, in some embodiments, provides management of image files (114, 116, 118) for the Industrial Apps to run on real-time controller 112, the local field agent 110, and on the cloud control infrastructure 106.

The cloud control infrastructure 106 includes analytics environment 128 that can perform analysis on data associated with the local embedded control device 102, the plant asset 108, and a fleet of plant assets 108.

Example System

FIG. 6 is a diagram of an example system of FIG. 1, in accordance with an illustrative embodiment.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications may be referenced. The disclosures of these publications in their entireties are hereby incorporated by reference into this application in order to more fully describe the state of the art to which the methods and systems pertain.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

Various embodiments of the disclosure may include one or more special purpose computers, systems, and/or particular machines that facilitate the receipt, processing, and/or output of analog and/or digital data. A special purpose computer or particular machine may include a wide variety of different software modules and/or computer-implemented or computer-executable instructions in various aspects. As explained in greater detail below, in certain aspects, these various software components may be utilized to facilitate the operation of an IO circuit and/or the processing of received analog or digital data.

Although specific features of various embodiments may be shown in some drawings and not in others, this is for convenience only. In accordance with the principles of the systems and methods described herein, any feature of a drawing may be referenced or claimed in combination with any feature of any other drawing.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), or any other circuit or processor capable of executing the functions described herein. The methods described herein may be encoded as executable instructions embodied in a computer readable medium, including, without limitation, a storage device or a memory device. Such instructions, when executed by a processor, cause the processor to perform at least a portion of the methods described herein. The above examples are exemplary only, and thus are not intended to limit in any way the definition or meaning of the term processor.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An apparatus comprising:
    a plurality of network interfaces, including a first network interface coupling the apparatus to a cloud-based infrastructure and a second network interface coupling the apparatus to one or more IO controllers each providing deterministic real-time control processes for a field device;
    a processor with two or more independent processing units, including a first independent processing unit and a second independent processing unit, the processor further comprising a hypervisor element segmenting the processor into at least two virtualized environments, a first of which virtualized environments executes, on the first independent processing unit, a local field agent communicating with the cloud-based infrastructure and a second of which virtualized environments executes, on the second independent processing unit, a real-time control engine controlling field devices coupled to the IO controllers; and
    a memory having first instructions and second instructions stored thereon, wherein execution of the first instructions, causes the first independent processing unit to:
        execute operations associated with a first operating system;
        communicate, via the first network interface, over a bi-direction communication interface, with one or more platform computing devices of the cloud-based infrastructure; and
        provide control data from the cloud-based infrastructure to the real-time control engine,
    wherein execution of the second instructions, causes the second independent processing unit to:
        execute real-time operations associated with a second operating system; and
        communicate, via the second network interface, with the one or more IO controllers,
        wherein execution of the second instructions by the second independent processing unit is parallel to and independent of the execution of the first instructions by the first independent processing unit.

2. The apparatus of claim 1, further comprising a shared memory space accessible by both the first and second independent processing units, wherein the execution of the second instructions causes the second independent processing unit to transmit to the shared memory space, via a local network interface located between the first independent processing unit and the second independent processing unit, data acquired from the communication with the one or more IO controllers, the first independent processing unit being configured, via the first instructions, to access the data stored in the shared memory space and to transmit, via the first network interface, the data stored in the shared memory space, a portion thereof, or parameters derived therefrom, to one or more computing devices associated with the cloud-based infrastructure.

3. The apparatus of claim 2, wherein the execution of the first instructions causes the first independent processing unit to:
    compare to a pre-defined threshold a difference between the data stored in the shared memory space and a prior stored data; and
    in response to determining the difference being outside the range of the pre-defined threshold, the execution of the first instructions causes the first independent processing unit to transmit to the one or more computing devices associated with the cloud platform the data stored in the shared memory space.

4. The apparatus of claim 2, wherein the cloud platform is configured to perform subsequent analysis on the data received thereat from the apparatus.

5. The apparatus of claim 1, wherein the execution of the first instructions causes the first independent processing unit to:
    interrogate, via the first network interface, a pre-defined computing device of the cloud based infrastructure for updatable instructions selected from the group consisting of the first instructions associated with first operating system, first instructions associated with an application to be executed by the first independent processing unit, the second instructions associated with second operating system, second instructions associated with an application to be executed by the second independent processing unit; and
    in response to determining presence of a given updatable instructions, the execution of the first instructions causes the first independent processing unit to:
        retrieve, via the first network interface, the given updatable instructions; and
        store the given updatable instructions, wherein the given updatable instructions are subsequently used to update the first or the second instructions.

6. The apparatus of claim 1, wherein the execution of the second instructions causes the second independent processing unit to:
    compare a difference between the acquired data and a prior data to a pre-defined threshold; and
    in response to determining the difference being outside the range of the pre-defined threshold, the execution of the second instructions causes the second independent processing unit to transmit to a shared memory space accessible to the first independent processing unit, via a local network interface located between the first independent processing unit and the second independent processing unit, data acquired from the communication with the one or more IO controllers, the first independent processing unit being configured, via the first instructions, to access the data stored in the shared memory space and to transmit to one or more computing devices associated with the cloud-based infrastructure, via the first network interface, the data stored in the memory space, a portion thereof, or a derived parameter derived therefrom.

7. The apparatus of claim 1, wherein the execution of the second instructions causes the second independent processing unit to execute operations associated with an OPC (Open Platform Communications) server.

8. The apparatus of claim 1, wherein the execution of the second instructions causes the second independent processing unit to execute operations associated with a model application or a control application for control of the field devices.

9. The apparatus of claim 1, wherein the execution of the first instructions causes the first independent processing unit to execute operations associated with a model application or a control application for control of the field devices.

10. The apparatus of claim 1, wherein the processor comprises a third independent processing unit, the first instructions, when executed by the third independent processing unit, cause the third independent processing unit to, in combination with the first independent processing unit:
    perform the operations associated with the first operating system; and
    communicate, via the first network interface, over the bi-direction communication, with the one or more platform computing devices.

11. The apparatus of claim 1, wherein the processor comprises a fourth independent processing unit, wherein the second instructions, when executed by the fourth independent processing unit, cause the fourth independent processing unit to, in combination with the second independent processing unit:
    execute the real-time operations associated with the second operating system; and
    communicate, via the second network interface, with the one or more IO controllers.

12. The apparatus of claim 1, wherein the execution of the first instructions causes the first independent processing unit to retrieve, via the first network interface, data from the one or more platform computing devices, the retrieved data being stored at a shared memory space accessible to the second independent processing unit, wherein the retrieved data is used in a control application executed by the second independent processing unit.

13. A system comprising:
    a cloud platform including a plurality of platform computing devices;
    a processor having two or more independent processing units, including a first independent processing unit and a second independent processing unit, the processor further comprising a hypervisor element segmenting the processor into at least two virtualized environments;
    a field agent executing, on the first independent processing unit, within the first virtualized environment, the field agent configured to operatively communicate with the cloud platform and provide control data from the cloud platform to a real-time controller controlling field devices coupled to IO controllers each providing deterministic real-time control processes for a field device; and
    the real-time controller executing, on the second independent processing unit, within the second virtualized environment, wherein the real-time controller is configured to execute one or more control applications to control one or more field devices, wherein the field agent and the real-time controller execute in parallel and independent of one another.

14. A system in accordance with claim 13, wherein the field agent is configured to:
    interrogate a pre-defined computing device of the plurality of platform computing devices for updatable instructions associated with either the field agent or the real-time controller; and
    in response to determining the presence of a given updatable instructions, retrieve the updatable instructions.

15. The system in accordance with claim 14, wherein the processor is further configured to update the field agent or the real-time controller based on the retrieved updatable instructions.

16. A method implemented via a first computing device comprising at least one processor in communication with at least one memory device, the method comprising:
    instantiating in the first computing device, via a hypervisor element, a first virtualized environment and a second virtualized environment;
    executing, at the first computing device, in the second virtualized environment, a real-time embedded controller for control of a connected equipment, wherein the real-time embedded controller executes a first real-time control application;

executing, at the first computing device, in the first virtualized environment, a field agent that is communicatively coupled to the real-time embedded controller, the field agent being configured to communicate, via a network interface, over a bi-direction communication, with one or more platform computing devices and provide control data from the one or more platform computing devices to the real-time embedded controller, wherein the field agent executes a second control application;

interrogating, via the field agent, a pre-defined computing device of the one or more platform computing devices for updatable instructions associated with either the first real-time control application or the second control application; and in response to determining presence of a given updatable instructions, retrieving, via the field agent, the updatable instructions.

17. The method of claim 16, comprising updating the first real-time control application or the second control application based on the retrieved updatable instructions.

18. The method of claim 16, wherein the real-time embedded controller is implemented on one or more first independent processing units of a processor and wherein the field agent is implemented on one or more second independent processing units of the same processor, wherein the real-time embedded controller and the field agent are each configured to operate independently and in parallel to one another.

19. The method of claim 18, wherein the field agent executes first instructions associated with a first operating system, and wherein the real-time embedded controller executes second instructions associated with a second operating system, the first operating systems and second operating system each executing independent processes from one another.

\* \* \* \* \*

UNITED STATES PATENT AND TRADEMARK OFFICE
CERTIFICATE OF CORRECTION

PATENT NO. : 11,477,083 B2
APPLICATION NO. : 15/843882
DATED : October 18, 2022
INVENTOR(S) : Daniel Halvard Miller et al.

It is certified that error appears in the above-identified patent and that said Letters Patent is hereby corrected as shown below:

On the Title Page

At page 2, in Column 2, item (56), under "OTHER PUBLICATIONS", Line 9, "hlml," should be -- html, --.

At page 2, in Column 2, item (56), under "OTHER PUBLICATIONS", Line 14, "1/0" should be -- I/O --.

At page 3, in Column 1, item (56), under "OTHER PUBLICATIONS", Line 1, "soflware" should be -- software --.

At page 3, in Column 1, item (56), under "OTHER PUBLICATIONS", Line 2, "software, D/3 Version 15 {D3v15)" should be -- software, D/3 Version 15 (D3v15) --.

At page 3, in Column 1, item (56), under "OTHER PUBLICATIONS", Line 9, "{LIC)" should be -- (LIC) --.

At page 3, in Column 1, item (56), under "OTHER PUBLICATIONS", Lines 19-20, "Advances in Computing, Communications and Informatics (ICACCI)," should be -- International Conference on Advances in Computing, Communications and Informatics (ICACCI), --.

In the Specification

At Column 5, Line 52, "systems" should be -- system --.

At Column 6, Line 31, "includes from the" should be -- includes --.

At Column 11, Line 66, "is" should be -- are --.

Signed and Sealed this
Sixteenth Day of December, 2025

John A. Squires
*Director of the United States Patent and Trademark Office*

CERTIFICATE OF CORRECTION (continued)
U.S. Pat. No. 11,477,083 B2

At Column 12, Line 66, "services" should be -- service --.

At Column 13, Line 46, "Architecture))." should be -- Architecture))). --.

At Column 15, Lines 3-4, "Communication Protocol (Highway Addressable Remote Transducer)" should be -- (Highway Addressable Remote Transducer) Communication Protocol --.

At Column 15, Line 28, "application;" should be -- application. --.

At Column 16, Line 45, "the a" should be -- a --.

At Column 18, Line 19, "Mobile" should be -- mobile --.

At Column 18, Line 65, "is" should be -- is in --.

In the Claims

At Column 22, Line 13, "10" should be -- IO --.

At Column 24, Line 17, "systems" should be -- system --.